Eli M. Morrison & James K. Ross.
81527 Thill Coupling

PATENTED
AUG 25 1868

Witnesses

Inventor
Eli M. Morrison
James K. Ross
per Alexander Mason
Atty

United States Patent Office.

ELI M. MORRISON AND JAMES K. ROSS, OF NOBLESVILLE, INDIANA.

*Letters Patent No. 81,527, dated August 25, 1868.*

IMPROVEMENT IN THILL-COUPLING.

*The Schedule referred to in these Letters Patent and making part of the same.*

TO ALL WHOM IT MAY CONCERN:

Be it known that we, ELI M. MORRISON and JAMES K. ROSS, of Noblesville, in the county of Hamilton, and in the State of Indiana, have invented certain new and useful Improvements in Thill-Coupling; and do hereby declare that the following is a full, clear, and exact description thereof, reference being had to the accompanying drawings, and to the letters of reference marked thereon.

The nature of our invention consists in providing one or both ears of an ordinary carriage-clip with grooves or key-seats, and the inner side, between said ears, with rubber packing; and also in shaping the end of the thill-iron eccentrically, and providing the same with a similar groove or key-seat, and in securing the thill-iron to the clip by means of a pin or bolt, which is provided with one or two keys, to fit into said grooves or key-seats on the thill-iron and ears of the clip.

By this arrangement, the thills or shafts can be removed or changed with great facility, simply by raising the shafts till the key or keys on the pin are on a line with the grooves or key-seats in the clip, and removing the pin, and, while in use, the pin or bolt cannot by any means be misplaced or lost, as there are no screws to wear or nuts to work off, as in those ordinarily used.

In order to enable others skilled in the art to make and use our invention, we will now proceed to describe its construction and operation, referring to the annexed drawings, which form a part of this specification, and in which—

Figure 1:
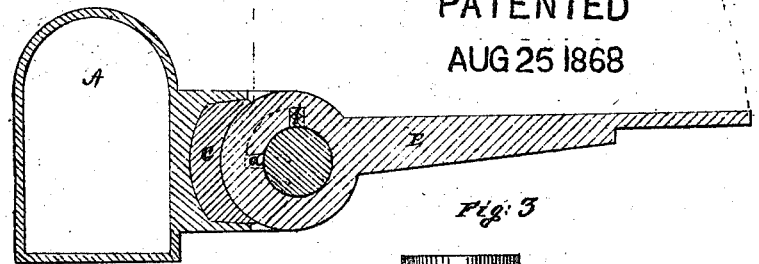
Figure 3:
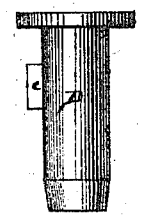
Figure 2:
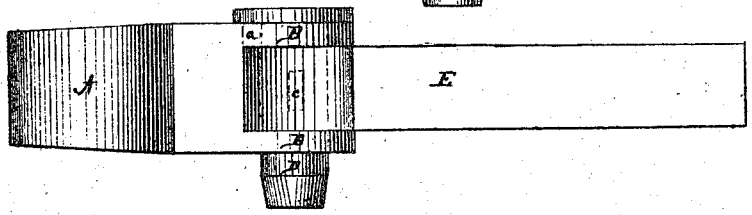

Figure 1 is a side sectional view,
Figure 2 a plan view, and
Figure 3 a side view of the pin or bolt.

A represents an ordinary clip for a carriage, so constructed as to fit the axle on the vehicle, and provided with two ears, B B.

The inner side of the clip, between the ears, is provided with rubber packing C, so that the end of the thill-iron will fit tight into the clip, and prevent any rattling.

One of the ears B is provided with a groove or key-seat, $a$, on the rear side of the hole through which the bolt passes.

E is a thill-iron, also provided with a groove or key-seat, $b$, on the upper side of the hole through which the pin or bolt passes. The end of this thill-iron is shaped eccentrically, so that the rear part thereof, when it is in its proper position, is thicker than the rest, and presses against the rubber packing C, as shown in fig. 1.

The pin or headed bolt D is provided with a key, $c$, to fit into the grooves $a$ and $b$.

When the thill-iron E is raised perpendicularly, the groove $b$ will be on a line with the groove $a$, in the ear of the clip, and the bolt D can easily be put in, and when the thill-iron is turned down in a horizontal position, the eccentric end thereof will press against the rubber packing.

There may be two keys instead of one on the bolt, in which case the groove or key-seat must be cut through both ears of the clip, and the second key will come through on the outside of the ear. This is thought to be necessary, in heavy vehicles, to keep the ears of the clip from spreading apart.

We do not claim the mode of securing the thill-iron E to the carriage-clip by means of the bolt D, provided with a key, $c$, to fit in grooves on said thill-iron and clip, but the manner in which the end of the thill-iron is shaped, so that, in combination with the rubber packing C, it will press against the bolt, and prevent rattling.

Having thus fully described our invention, what we claim as new, and desire to secure by Letters Patent, is—

The eccentrically-shaped thill-iron E, in combination with the carriage-clip A, rubber packing C, and bolt D, constructed as described, and operating substantially as and for the purposes herein set forth.

In testimony that we claim the foregoing, we have hereunto set our hands, this 13th day of May, 1868.

ELI M. MORRISON,
JAMES K. ROSS.

Witnesses:
R. L. WILSON,
I. C. HURST,
L. H. EMMONS.